United States Patent
Falk

(10) Patent No.: US 8,843,641 B2
(45) Date of Patent: Sep. 23, 2014

(54) PLUG-IN CONNECTOR SYSTEM FOR PROTECTED ESTABLISHMENT OF A NETWORK CONNECTION

(75) Inventor: Rainer Falk, Erding (DE)

(73) Assignee: Siemens Aktiengesellschaft, Munich (DE)

(*) Notice: Subject to any disclaimer, the term of this patent is extended or adjusted under 35 U.S.C. 154(b) by 262 days.

(21) Appl. No.: 13/110,690

(22) Filed: May 18, 2011

(65) Prior Publication Data

US 2011/0289231 A1    Nov. 24, 2011

(30) Foreign Application Priority Data

May 21, 2010   (DE) .................. 10 2010 021 257

(51) Int. Cl.
*G06F 13/00*  (2006.01)
*H04L 29/06*  (2006.01)

(52) U.S. Cl.
CPC ............. *H04L 63/10* (2013.01); *H04L 63/0853* (2013.01)
USPC .......................................... 709/227; 709/229

(58) Field of Classification Search
CPC ........................... H04L 63/10; H04L 63/0853
USPC ............ 709/227–229; 726/3–10, 16–21, 34; 713/160–163, 168–174, 184–186, 192, 713/194
See application file for complete search history.

(56) References Cited

U.S. PATENT DOCUMENTS

| | | | |
|---|---|---|---|
| 7,167,078 B2 * | 1/2007 | Pourchot | 340/5.61 |
| 7,509,676 B2 * | 3/2009 | Trueba | 726/22 |
| 7,565,529 B2 * | 7/2009 | Beck et al. | 713/156 |
| 8,146,072 B2 * | 3/2012 | Trueba | 717/170 |
| 8,458,293 B1 * | 6/2013 | Lemaitre et al. | 709/218 |
| 2005/0184856 A1 | 8/2005 | Pourchot | |
| 2006/0026283 A1 * | 2/2006 | Trueba | 709/225 |
| 2006/0026686 A1 * | 2/2006 | Trueba | 726/24 |
| 2006/0072527 A1 * | 4/2006 | Beck et al. | 370/338 |
| 2007/0186099 A1 * | 8/2007 | Beck et al. | 713/159 |
| 2009/0061678 A1 | 3/2009 | Minoo et al. | |
| 2009/0183233 A1 * | 7/2009 | Trueba | 726/3 |

FOREIGN PATENT DOCUMENTS

| | | |
|---|---|---|
| DE | 10 2005 040 984 | 3/2007 |
| DE | 10 2009 044 140 | 4/2010 |
| EP | 2034423 | 3/2009 |
| WO | WO 2009/086937 | 7/2009 |
| WO | WO 2010/040703 | 4/2010 |

\* cited by examiner

*Primary Examiner* — Kenneth Coulter
(74) *Attorney, Agent, or Firm* — Cozen O'Connor

(57) ABSTRACT

A plug-in connector system for a data communication interface comprising a network connector and a network socket is equipped with an integrated authentication function that is independent of network communication. The authentication is undertaken independently of the data transmission or the data communication. The enabling is undertaken by a physical connection between the contacts of the network socket, where the network connector associated therewith is established after successful authentication.

7 Claims, 2 Drawing Sheets

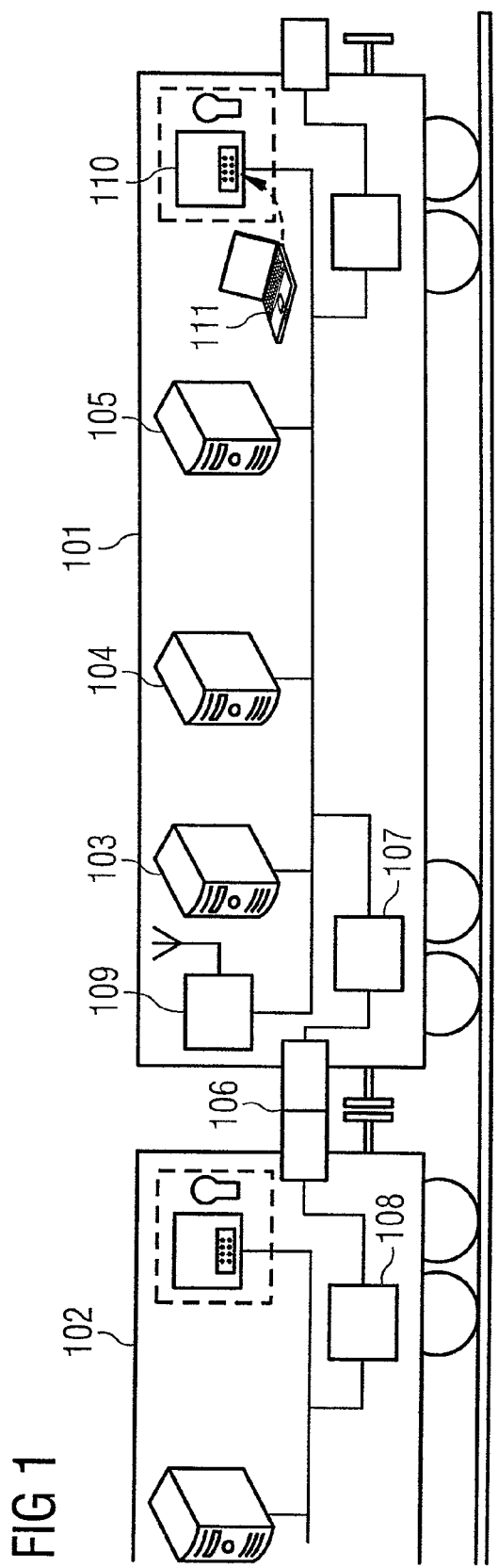

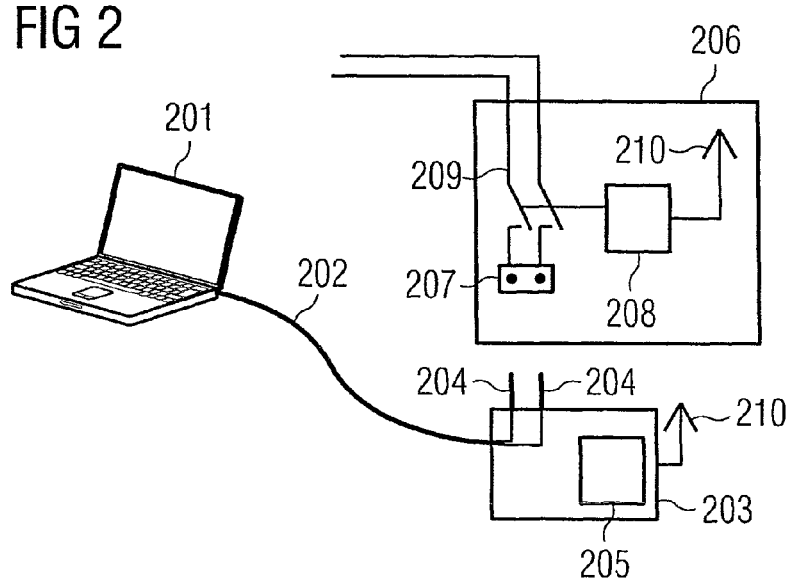
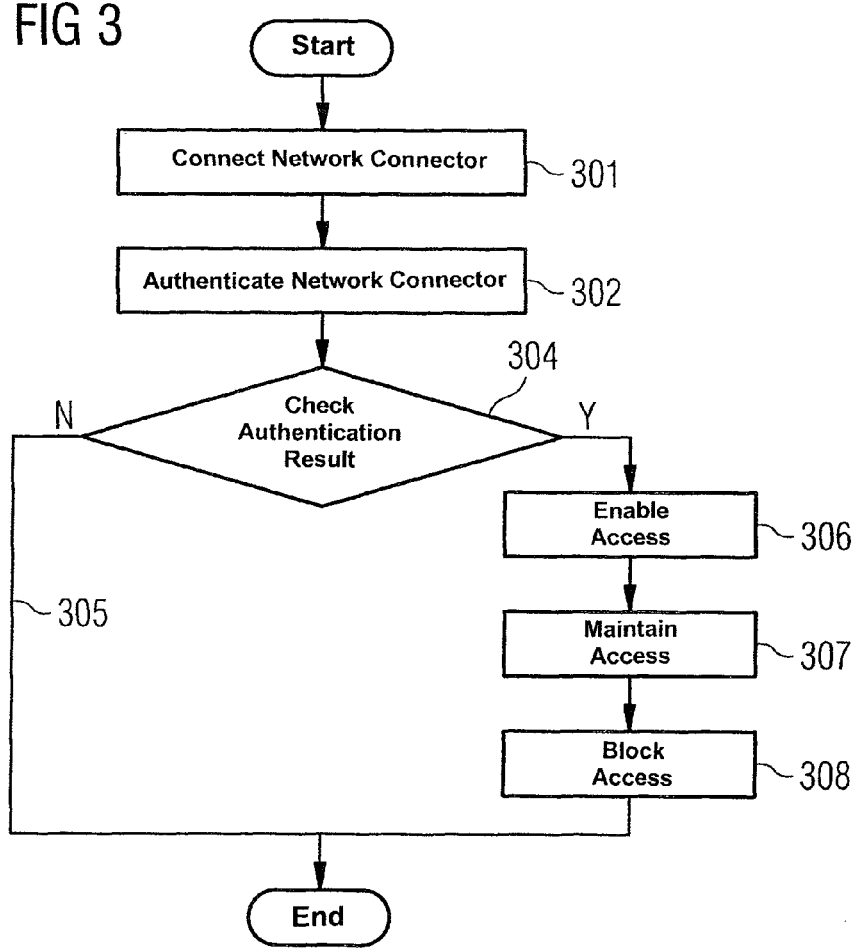

PLUG-IN CONNECTOR SYSTEM FOR PROTECTED ESTABLISHMENT OF A NETWORK CONNECTION

BACKGROUND OF THE INVENTION

1. Field of the Invention

The present invention relates to a plug-in connector system, and a network plug and a network socket for protected establishment of a network connection, which is especially suitable for granting previously defined maintenance companies or maintenance technicians access to a system that is to be maintained.

2. Description of the Related Art

Technical devices require maintenance at regular intervals or in the event of malfunctions. To guarantee operational security, the maintenance should only be undertaken by authorized personnel. Consequently, it is necessary to allow only appropriately authorized personnel access to the maintenance functionality of the machine or system. For example, an owner of a machine can make it possible that only maintenance personnel who have completed the appropriate training have access to the machine to be maintained. Thus, on the one hand, the safety of the maintenance technician and, on the other hand, the correct operation of the machine to be maintained can be guaranteed.

In such cases, mobile maintenance devices, such as notebooks or PDAs (Personal Digital Assistants), are normally used, which obtain maintenance access by a locally accessible interface to a specific industrial device, such as a train, an interlocking system, an automation controller or a medical device. The connection to the locally accessible interface is made by wire or wirelessly. Diagnostic functions can be called up through the maintenance access, error memories read out, configuration settings of the industrial system modified or software updates uploaded.

To grant access rights, an authentication check is usually performed in which a claimed identity is verified and thus the authorization for accessing the respective maintenance interface is checked. If the authentication check is successful, the access rights previously allocated to the respective user are granted.

Most known authentication methods are based on the entity to be authorized having to prove, in relation to a checking entity, that it is in possession of a secret and/or of an object. The best known authentication method is the transmission of a password in which the authenticating entity transmits a secret password directly to a checking entity. The checking entity or the authentication checking unit respectively then check the correctness of the transmitted password.

For administration of maintenance accesses in large systems, however, such a method involves a significant administrative overhead. In particular, when temporary maintenance technicians or freelancers are used, the respective maintenance passwords should be changed again once maintenance on the system to be maintained has been completed so that future maintenance access is no longer possible for said persons.

A further known option for secure administration of maintenance accesses is to provide the respective network sockets for maintenance access in an area to which access is physically protected. For example, the network socket can be secured with a lockable maintenance flap or can be located in a lockable room. Such a method is, however, associated with uncertainties because a physical access protection can be overcome with little effort in most cases. In addition, this type of solution also demands significant administrative outlay, for example, for distributing and collecting the mechanical keys.

SUMMARY OF THE INVENTION

It is therefore in the object of the present invention to provide a system for administering and implementing access rights to maintenance functionalities that is operable securely and with little effort.

This and other objects and advantages are achieved in accordance with the invention by a plug-in connector system, a network plug and a network socket, wherein the inventive plug-in connector system for protected establishment of a network connection comprises a network plug featuring an authentication unit and a network socket featuring an authentication checking unit and an enabling unit. The authentication unit, the authentication checking unit and the enabling unit include devices for performing the following steps:

A checking command is transferred by the authentication checking unit to the authentication unit. Based the checking command, a checking response is determined by the authentication unit and transferred to the authentication checking unit. The checking response is checked by the authentication checking unit. In the event of a successful check of the checking response, a physical connection is enabled between the network plug and network socket for protected establishment of the network connection by the enabling device.

In the preferred embodiment, a plug-in connection for a data communication interface is equipped with an integrated authentication function independent of network communication. The data communication connection typically involves an RJ45 or M12 plug-in connection. Consequently, the network connector fulfils the function of a key, without a mechanical key being needed, however. The authentication is undertaken independently of data transmission or data communication, so that neither a maintenance device nor a device to be maintained has to support this functionality. The enabling is undertaken by a physical connection being established between the contacts of the network socket and the network plug connected to it.

In an embodiment of the present plug-in connector, after the establishment of a network connection for a network connector by a physically access-protected network socket, identification information of the network connector is stored. Based on the identification information, the network connector is checked at a predeterminable number of further network sockets. In other words, an inventive maintenance cable with authentication function is connected to a physically access-protected maintenance access. In this case, identification information of the network connector is captured and stored by the system to be maintained. Thereafter, further maintenance accesses of the same system will typically be used with this network connector for a certain predeterminable period of time, in which case only the identification information is checked. As a result, a physical access protection only present at some maintenance interfaces can be used to indirectly secure maintenance access by openly accessible maintenance interfaces.

In accordance with an embodiment of the present connector system, the network connector is allowed to set up a network connection for a predeterminable period of time and/or for a predeterminable scope of access rights. Accordingly, the authentication information of a network connector includes information about the maintenance accesses or the period of time for which the respective network connector is authorized and thus able to be used. This allows definition of the systems to which maintenance access is possible with a specific network connector. For example, a network connector can comprise authentication information for an entire industry branch or for a predeterminable member of an industry branch or for a predeterminable system type or a predeterminable functionality of a system type. Furthermore, a period of time in which the network connector can be used can be included in the authentication information. In this way, it is ensured that stolen or lost maintenance cables automatically become invalid once a period of validity has elapsed.

The network connector in accordance with the contemplated embodiments features an authentication unit which is suitable for use in a plug-in connector system in accordance with the contemplated embodiments.

The inventive network socket features an authentication unit and an enabling unit which are suitable for use in an inventive plug-in connector system.

Other objects and features of the present invention will become apparent from the following detailed description considered in conjunction with the accompanying drawings. It is to be understood, however, that the drawings are designed solely for purposes of illustration and not as a definition of the limits of the invention. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained below in greater detail with exemplary embodiments which refer to the enclosed figures, in which:

FIG. 1 shows a schematic diagram of a railroad car with a number of control devices and a maintenance access;

FIG. 2 shows a schematic block diagram of a plug-in connection for maintenance access in accordance with the present invention; and FIG. 3 is a flow chart of a method for establishing a secure maintenance access in accordance with an embodiment of the invention.

DETAILED DESCRIPTION OF THE PRESENTLY PREFERRED EMBODIMENTS

FIG. 1 shows a first and a second railroad car 101, 102 where the control devices are each shown schematically. The diagram shows a train control system 103, a passenger infotainment system 104 and a train maintenance system 105 which are connected to each other over a network. The network of the individual railroad cars 101, 102 is connected by electrocouplings 106. Also shown are gateways 107, 108 by which the network connection between the individual railroad cars is routed. Access to the network from outside can be by wire or wirelessly. The diagram shows a wireless access 109 as a Wireless LAN Access Point and a wired access 110, i.e., maintenance access.

So that a mobile maintenance device 111 now obtains access to the maintenance network of the train, a maintenance access 110 is provided in the railroad car 101. This maintenance access 110 is located behind a lockable maintenance flap (not shown). To connect the mobile maintenance device 111 to the maintenance access 110 the maintenance flap is first mechanically unlocked. The mobile maintenance device 111 is then connected to the network socket 110 using a network connector. After successful authentication of the network connector of the mobile maintenance device 111, the maintenance access 110 is enabled by the physical connection to the data network of the railroad car being established.

In this way, for example, a control device for brake control can be maintained by uploading a software update. The mobile maintenance device 111, for data communication with the data network of the railroad car, can use RS232, USB, Ethernet or an IP protocol, for example.

FIG. 2 shows a schematic diagram of a plug-in connector system for protected establishment of a network connection for a maintenance technician in accordance with the invention. Here, the mobile maintenance device 201 is connected by a two-wire line 202 to a network connector 203. The network connector 203 comprises physical contacts 204 for establishing a data communication connection and an authentication unit 205. The network socket 206 includes contacts 207 for establishing a connection to the data network, an authentication checking unit 208 and an enabling device 209.

In this exemplary embodiment, authentication between the authentication unit 205 and the authentication checking unit 208 is undertaken wirelessly over a radio interface 210. The radio interface 210 can involve an Radio Frequency Identification (RFID) interface, for example. The authentication checking unit 208 transfers a checking command to the authentication unit 205. The authentication unit 205 determines a checking response based on a checking command and, in turn, transfers this response to the authentication checking unit 208. In the event of a successful check by the authentication checking unit 208, the physical connection between network connector 203 and network socket 206 is through-connected by the enabling device 209. The enabling device 209 is realized mechanically by a relay, for example, or electronically by an activatable optocoupler.

In one embodiment a wired interface is provided for authentication of the network connector instead of the wireless interface 210. This can typically involve an Inter IC (I²C) interface or an Serial Peripheral (SPI) interface bus.

In determining the checking response, the authentication unit 205 can perform a cryptographic computation using a stored cryptographic key. In such cases, a symmetrical cryptographic method, e.g., Data Encryption Standard (DES), Advanced Encryption Standard (AES) or Hash Based Message Authentication Cope-Secure Hash Algorithm-1 (HMAC-SHA1) can be used. An asymmetric cryptographic method, e.g., Rivest, Shamir and Adelatan (RSA), Digital Signature Algorithm (DSA) or Elliptic Curve Cryptography Digital Signature Algorithm (ECC-DSA) can also be used. In one embodiment, the authentication unit transmits a digital certificate, e.g., in accordance with X.509.

FIG. 3 is a flowchart for secure creation of a connection between a mobile maintenance device and a maintenance access. The network connector is connected to the network socket, as indicated in step 301. The network connector is authenticated by the network socket in accordance with the above-described methodologies, as indicated in step 302. After successful authentication, the authorization of the network connector is checked, as indicated in step 304. If the network connector does not have any authorization to access the maintenance network the access is rejected, as indicated in step 305.

However, if the access check is successful the access to the maintenance network is enabled (see step 306), and maintained for a predeterminable period of time, as indicated in step 307. After the predeterminable period of time has elapsed, the maintenance access is blocked, as indicated in step 308.

In another embodiment the access to the maintenance network remains enabled until the network connector is removed from the network socket.

Thus, while there are shown, described and pointed out fundamental novel features of the invention as applied to preferred embodiments thereof, it will be understood that various omissions and substitutions and changes in the form and details of the illustrated apparatus, and in its operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice.

What is claimed is:

1. A plug-in connector system for protected establishment of a network connection, comprising:
    a network connector including an authentication unit; and
    a network socket including an authentication checking unit and an enabling unit,
    the authentication checking unit being configured to transfer a checking command to the authentication unit,
    the authentication unit being configured to determine a checking response based on the checking command transferred by the authentication checking unit and transfer the checking response to the authentication checking unit, determining the checking response comprising performing a cryptographic computation utilizing a stored cryptographic key;
    the authentication checking unit being configured to check the transferred checking response, and
    the enabling unit being configured to enable a physical connection between the network connector and the network socket for protected establishment of the network connection in an event of a successful check of the checking response by the authentication checking unit;
    wherein the network connector and the network socket each include a communication unit for wired transfer of the checking command and the checking response between the authentication unit and the authentication checking unit.

2. The connector system as claimed in claim 1, wherein the network socket is provided in an area protected from physical access.

3. The connector system as claimed in claim 1, wherein the network socket is a physically access-protected network socket, and identification information of the network connector is stored in the connector system after the protected establishment of the network connection for the network connector through the physically access protected network socket, the connector system further comprising a predeterminable number of further network sockets configured to check the stored identification information of the network connector.

4. The plug-in connection system as claimed in claim 1, wherein the network connector is configured to allow establishment of the network connection for only a predetermined period of time.

5. The plug-in connection system as claimed in claim 1, wherein the network connector is provided with a predeterminable scope of access rights to establish a network connection.

6. A network connector having an authentication unit configured for implementation in a plug-in connection system for protected establishment of a network connection, the authentication unit being configured to determine a checking response based on a checking command transferred from an authentication checking unit and to transfer the checking response to the authentication checking unit for protected establishment of the network connection, determining the checking response comprising performing a cryptographic computation utilizing a stored cryptographic key; wherein the network connector includes a communication unit for wired transfer of the checking command and the checking response between the authentication unit and the authentication checking unit, the network connector being physically connectable to an enabling unit configured to enable a physical connection between the network connector and a network socket for the protected establishment of the network connection in an event of a successful check of the checking response by the authentication checking unit.

7. A network socket having an authentication checking unit and an enabling unit, the network socket being configured for implementation in a plug-in connection system for protected establishment of a network connection, the authentication checking unit being configured to transfer a checking command to an authentication unit and to check a transferred checking response from the authentication unit, checking the transferred checking response comprising performing a cryptographic computation utilizing a stored cryptographic key, and the enabling unit being configured to enable a physical connection between a network connector and the network socket for protected establishment of the network connection in an event of a successful check of the checking response transferred from the authentication unit; wherein the network socket includes a communication unit for wired transfer of the checking command and the checking response between the authentication unit and the authentication checking unit.

* * * * *